Patented Oct. 15, 1940

2,218,148

UNITED STATES PATENT OFFICE 2,218,148

MANUFACTURE OF BENZENE HEXA-CHLORIDE

Thomas Hardie, Lancashire, England, assignor to Imperial Chemical Industries Limited, Westminster, London, England, a corporation of Great Britain No Drawing. Application November 15, 1937, Serial No. 174,733. In Great Britain November 24, 1936

4 Claims. (Cl. 260—648)

This invention relates to the manufacture of benzene hexachloride by the chlorination of benzene. More particularly, it is concerned with an improved process for the manufacture of benzene hexachloride wherein the chlorination is interrupted before the total quantity of benzene present has been converted into the hexachloride, the solid product removed by filtration, and the filtrate, after the addition of further amounts of benzene, subjected to further chlorination.

In the preparation of benzene hexachloride, it has already been proposed to chlorinate benzene in the presence of a large volume of dilute alkali. However, this process is inefficient and results in only relatively poor yields of the hexachloride.

A process wherein the benzene is treated with chlorine, preferably in the presence of light, the liquid becoming more viscous as chlorination proceeds until finally an almost solid mass is obtained, is also known to chemists. However, this method presents mechanical difficulties in the subsequent purification steps in that the incompletely chlorinated products are not easily removed.

I have now found that these disadvantages in the preparation of benzene hexachloride by the direct chlorination of benzene in the presence of actinic radiation may be avoided by stopping the reaction at a point wherein the liquid contains an amount of solid product which is not too great to be easily separated by filtration. Preferably, temperatures below about 20° C. are employed. When the reaction product is partially converted to the solid benzene hexachloride, the solid product is removed by filtration and the filtrate, after the addition of further quantities of benzene, again subjected to the action of chlorine in the presence of actinic light. The chlorination is preferably carried out in the absence of those metals which tend to promote the formation of substituted benzenes to any substantial extent.

By this means a continuous process for the manufacture of benzene hexachloride results, which process does not necessitate troublesome mechanical treatment or the filtration of extremely thick slurries in order to obtain the desired solid hexachloride. By stopping the chlorination when the reaction mixture is not too thick to permit ready filtration, filtering to remove the solid product, thereafter diluting the filtrate by the addition of further amounts of benzene and subjecting to further chlorination, yields are obtained which are high or as high as can be obtained by other known methods. By reworking the filtrate after the removal of the solid product the formation of mono- and disubstituted chloro benzenes is greatly reduced.

The amount of solid product which may be allowed to accumulate in the reaction liquid before being removed by filtration is not critical. I have found in practice that it is desirable to interrupt the chlorination and filter off the solid product when approximately half of the theoretical quantity of chlorine has been absorbed. Similarly, the amount of benzene which should be added to the filtrate before the second chlorination is begun is again not critical. However, it is convenient to add such a quantity of benzene that the reaction mixture is made up to its original bulk.

After the process has been continued for some time, quantities of benzene substitution products will accumulate in the reaction mixture, even though, as has been previously stated, the described process tends to diminish the formation of such products. It is therefore necessary at infrequent intervals to reject the filtrate after the solid product has been filtered off and to recommence the process by chlorinating a fresh batch of benzene.

The following example illustrates one method of carrying out my invention. In this example all parts specified are by weight.

Example

Chlorine gas was gradually passed into 660 parts of benzene contained in a lead-lined reaction vessel until 890 parts of the gas had been absorbed. The mixture was stirred continuously and the temperature maintained at 15 to 20° C.

The supply of chlorine was then interrupted and the precipitated solid filtered off and dried. In weight, it was found to be equivalent to 900 parts. The mother liquid was then mixed with 330 parts of benzene and the mixture again treated with 890 parts of chlorine in the manner described.

After filtering the reaction mixture resulting from the second chlorination, the filtrate was again mixed with a smaller quantity of benzene and again chlorinated in a similar manner. In this way, a continuous process for the preparation of benzene hexachloride resulted.

Since various changes and modifications may be made in my process as described, I do not desire to be limited to the exact temperatures nor to exact amounts and procedural details. The scope of my invention is to be construed in accordance with the appended claims.

I claim:

1. A process for preparing solid benzene hexachloride which comprises chlorinating liquid benzene in a non-aqueous system with gaseous chlorine in the presence of actinic light and in the essential absence of substitution chlorination metal catalysts until a portion of the benzene present is converted into solid benzene hexachloride in amount easily separable by filtration, filtering off the solid product, adding fresh benzene to the filtrate and subjecting said enriched filtrate to further chlorination.

2. A process for preparing solid benzene hexachloride which comprises chlorinating liquid benzene in a non-aqueous system with gaseous chlorine in the presence of actinic light at a low temperature within the range wherein benzene is liquid at ordinary pressure and in the essential absence of substitution chlorination metal catalysts until a portion of the benzene present is converted into solid benzene hexachloride in amount easily separable by filtration, filtering off the solid product, adding fresh benzene to the filtrate and subjecting said enriched filtrate to further chlorination.

3. A process for preparing solid benzene hexachloride which comprises chlorinating liquid benzene in a non-aqueous system with gaseous chlorine in the presence of actinic light at a temperature below 20° C. and in the essential absence of substitution chlorination metal catalysts until a portion of the benzene present is converted into solid benzene hexachloride in amount easily separable by filtration, filtering off the solid product, adding fresh benzene to the filtrate and subjecting said enriched filtrate to further chlorination.

4. A process for preparing benzene hexachloride which comprises chlorinating liquid benzene in a non-aqueous system with gaseous chlorine at a temperature below 20° C. in the presence of actinic light and in the essential absence of substitution chlorination metal catalysts until approximately one-half the theoretical quantity of chlorine for hexachloride production has been absorbed, filtering off the solid product, adding fresh benzene to the filtrate and subjecting said enriched filtrate to further chlorination.

THOMAS HARDIE.